United States Patent [19]
Goldberg

[11] Patent Number: 5,009,939
[45] Date of Patent: Apr. 23, 1991

[54] COMPOSITE PAPERBOARD AND POLYMER PACKAGE

[75] Inventor: Barry A. Goldberg, Highland Park, Ill.

[73] Assignee: Westvaco Corporation, New York, N.Y.

[21] Appl. No.: 411,038

[22] Filed: Sep. 22, 1989

[51] Int. Cl.⁵ .............................................. B65D 5/56
[52] U.S. Cl. .................................. 428/34.2; 220/339; 229/3.1; 229/902; 264/511; 264/515; 264/516; 426/115
[58] Field of Search ................. 426/115; 229/3.1, 902; 220/339; 428/34.2; 264/511, 515, 516

[56] References Cited
U.S. PATENT DOCUMENTS

| | | | |
|---|---|---|---|
| 4,026,458 | 5/1977 | Morris et al. | 229/3.1 |
| 4,551,366 | 11/1985 | Maruhashi et al. | 428/34.2 |
| 4,595,611 | 6/1986 | Quick et al. | 428/34.2 |
| 4,618,090 | 10/1986 | Cortellucci | 220/339 |
| 4,795,665 | 1/1989 | Lancaster et al. | 428/34.2 |
| 4,844,330 | 7/1989 | Roosa et al. | 426/115 |

Primary Examiner—James J. Seidleck
Attorney, Agent, or Firm—W. A. Marcontell; R. L. Schmalz

[57] ABSTRACT

The vessel portion of a gas-tight container suitable for packaging fresh foods is produced as a composite of paperboard and polymer film. A pair of folded paperboard blanks, pre-cut and pre-formed, are inserted into the opposite halves of split mold elements to a blow molding machine. Vacuum orifices in each mold half unit temporarily secure the position of a respective paperboard blank. The paperboard lined mold halves are closed upon a hot, extruded parison of malleable polymer leaving an end portion of the parison tube projecting from the closed mold unit. A fluid conducting needle penetrates this projected end portion to inflate the parison with an appropriate blowing gas. Such inflation expands the malleable polymer, seamlessly and creaselessly, into the internal corners and crevices of the folded paperboard blanks. Following chilling, the mold unit is opened and the pair of paperboard flanks are ejected as a singular unit, joined by a molded flange portion of the continuous polymer film. Finally, the two polymer coated paperboard vessels are separated by trimming about the flange.

12 Claims, 7 Drawing Sheets

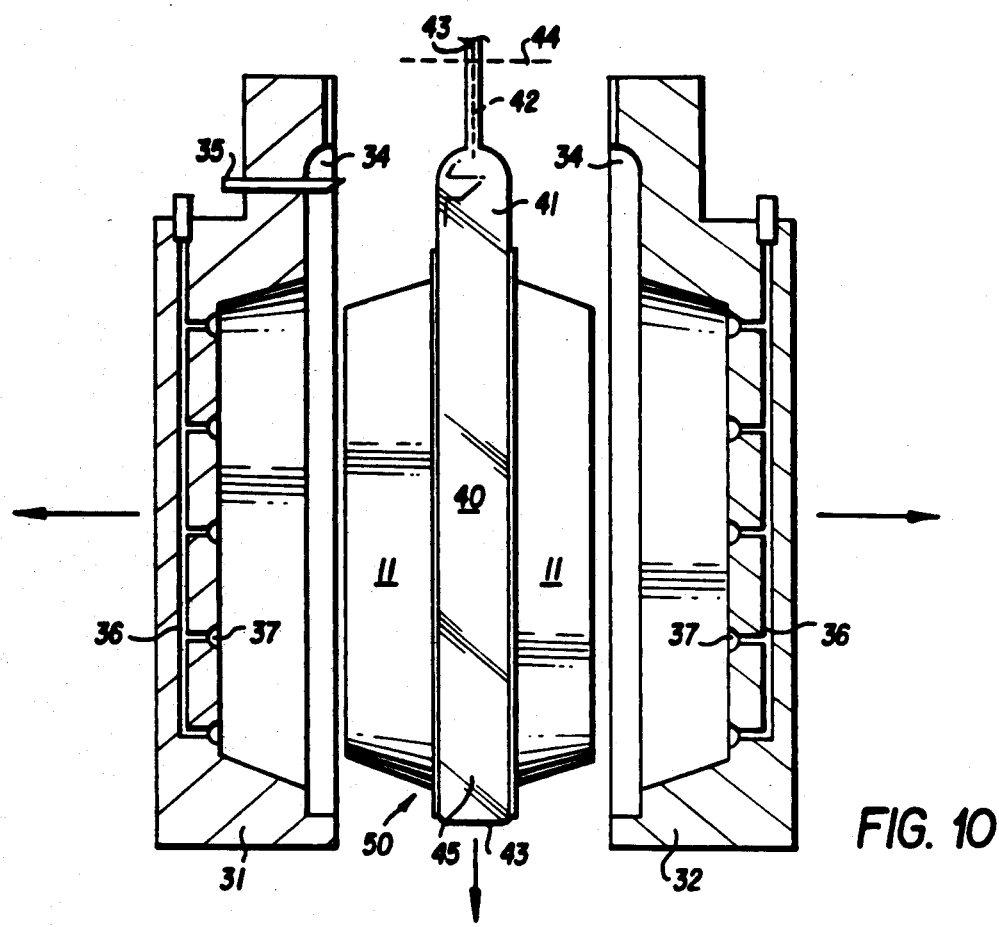
FIG. 10
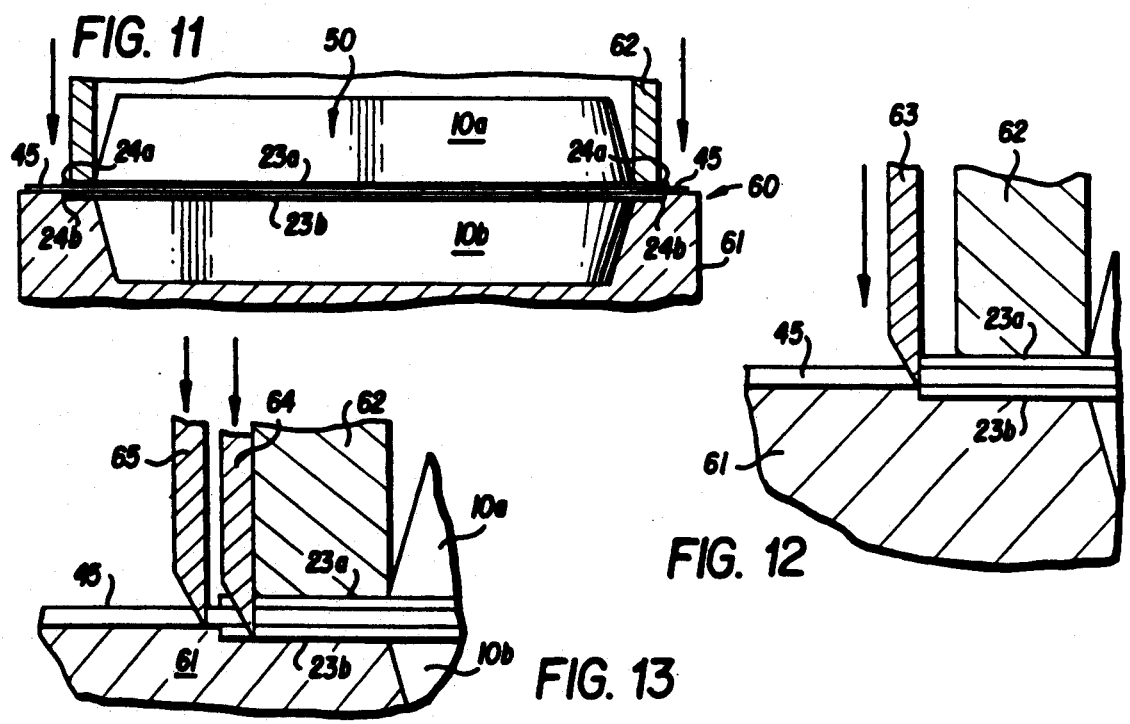
FIG. 11
FIG. 12
FIG. 13

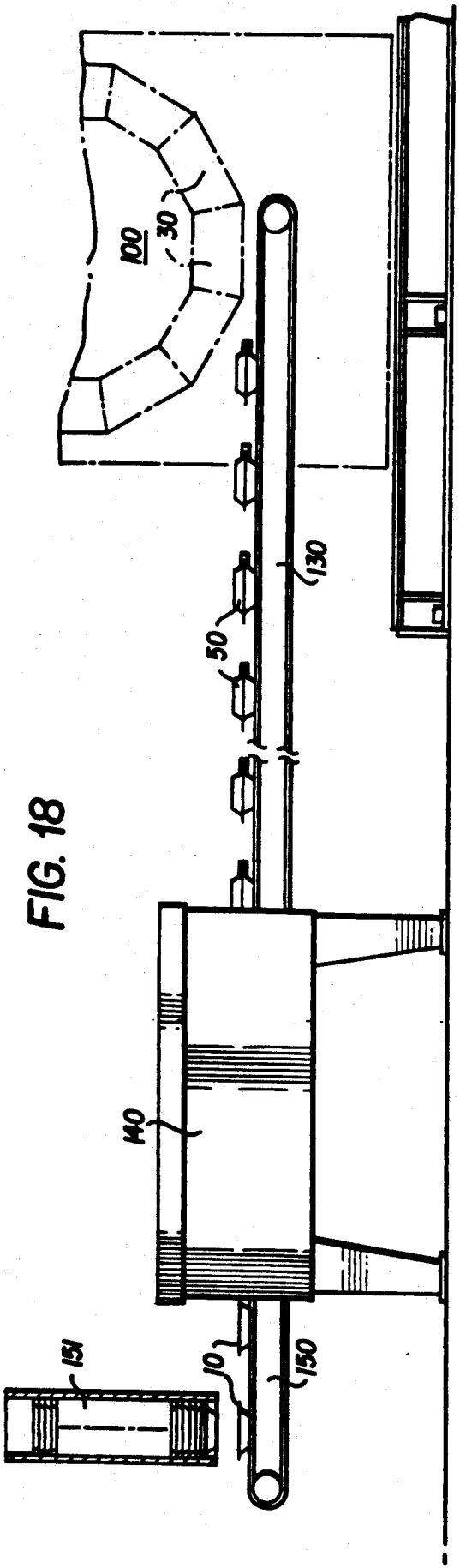
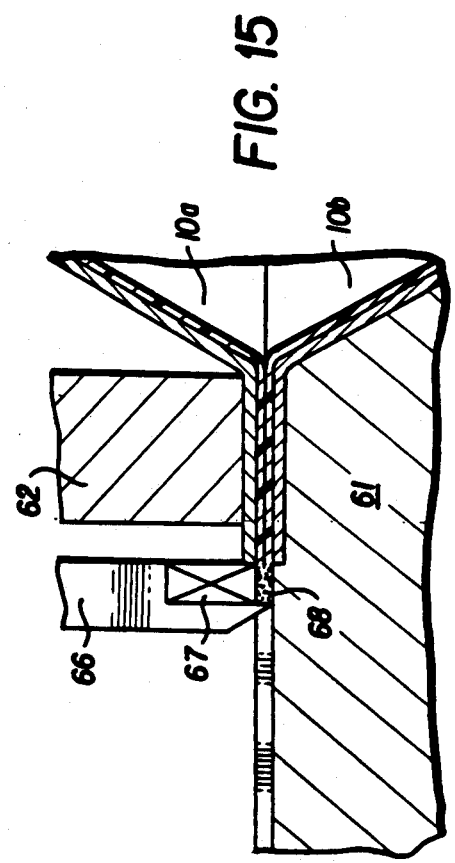

COMPOSITE PAPERBOARD AND POLYMER PACKAGE

BACKGROUND OF THE INVENTION

1. Field of the Invention

The present invention relates to a packaging article and a corresponding manufacturing method and apparatus.

2. Description of the Prior Art

Modified-atmosphere packaging (MAP) or controlled-atmosphere packaging (CAP) are terms used to describe packaging systems designed to impede or deter food aging processes and extend the shelf-life of fresh food. Central to these packaging systems is the principle of surrounding the food product with a gaseous environment formulated to slow the natural processes of oxidation, respiration and ripening. Typical constituents of such an environment include oxygen, nitrogen, carbon dioxide, ethylene and water vapor. This gaseous environment is confined about the food product by a barrier material package having designed permeability characteristics respective to those gases which are to be maintained within the confinement volume and/or those to be excluded from it.

Prior art packages for MAP and CAP applications are constructed entirely of plastic; typically consisting of a 20-50 mil thick, generally multi-layered, thermoformed tray covered by a heat-sealed lid of plastic film. Both barrier and structural properties are provided by the polymer materials. Packaging graphics are provided by independently applied paper labels or a separate paperboard carton.

Insofar as a gaseous barrier is required of such a package, a 3-5 mil (prethermoformed) sheet thickness of polymer is sufficient; the remaining mass of prior art plastic package thickness being devoted to the structural function. However, the same structural function is readily accomplished by a 7-35 mil thickness of paperboard which is not only substantially less expensive than plastic but is also biodegradable. Moreover, content identification and promotional graphics may be applied to paperboard prior to cutting and forming the container blank.

On the other hand, paperboard is a stiff, essentially planar material having limited yield and stretch capacity to be formed to the warped surfaces of vessels, trays and other containers. In less demanding packaging systems, such containers are formed by folded lap joints secured by adhesives. However, such joints are frequently discontinuous and tend to leak fluids.

Although it is known that others have attempted to fabricate MAP and CAP systems by vacuum drawing continuous polymer film into the interior of a preerected paperboard vessel, success with such systems has been limited. Non-uniformity of vacuum distribution prevents full corner contact of the film into the vessel interior. Additionally, vacuum formed barriers are plagued with pin-holing and poor barrier adhesion.

Considerable fabrication and marketing success has been achieved with paperboard vessels lined with thermoformed polystryene or polyvinyl chloride film. However, these polymers have severe limitations in a microwave oven environment.

It is, therefore, an object of the present invention to teach a method and apparatus for applying a continuous, thin but adequate gas barrier of blow molded polymer film such as polypropylene base materials to the interior of a fold formed paperboard vessel shape which could be microwaved with most food products.

Another object of the present invention is to provide the food processing and distribution industry with a high quality MAP/CAP system at substantially less cost than most solid polymer vessel systems that are presently available.

Another object of the present invention is to provide the food processing and distribution industry with a gas tight package article that may be printed with high quality graphics prior to forming and filling.

Another object of the present invention is to provide the food processing and distribution industry with a microwaveable paperboard asceptic packaging unit.

SUMMARY OF THE INVENTION

These and other objects of the invention to be subsequently described are accomplished by means of blow molding a polymer parison within a split mold having a preformed paperboard vessel blank secured against the wall of both mold halves. After chilling, the unitized pair of laminated vessels are ejected from the open mold and separated by trimming.

BRIEF DESCRIPTION OF THE DRAWINGS

Relative to the drawings wherein like reference characters designate like or similar elements throughout the several figures of the drawings:

FIG. 10 sectionally illustrates a blow molding unit of the present invention in the open position after parison inflation;

FIG. 11 sectionally illustrates the blow molded product of the invention in a trimming die;

FIG. 12 is a sectional detail of a single knife trimming die;

FIG. 13 is a sectional detail of a two-knife trimming die;

FIG. 15 is a sectional detail of a hinged product fusing and trimming die;

FIG. 18 is an enlarged elevational detail of an integrated production unit for the present invention.

DESCRIPTION OF THE PREFERRED EMBODIMENTS

Figure 1:
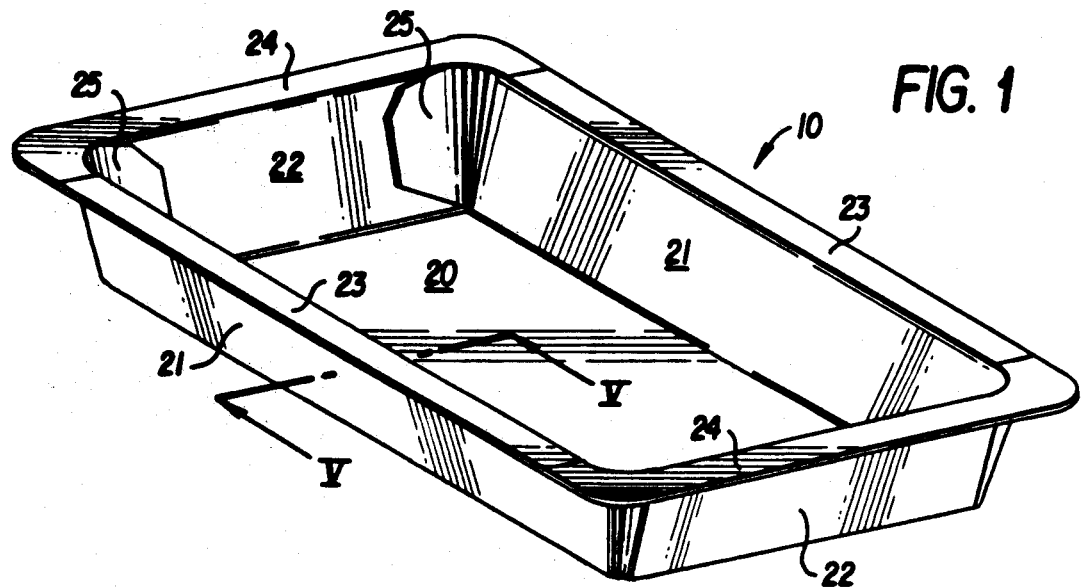
FIG. 1 is a pictorial view of the article objective of the invention.
Figure 5:
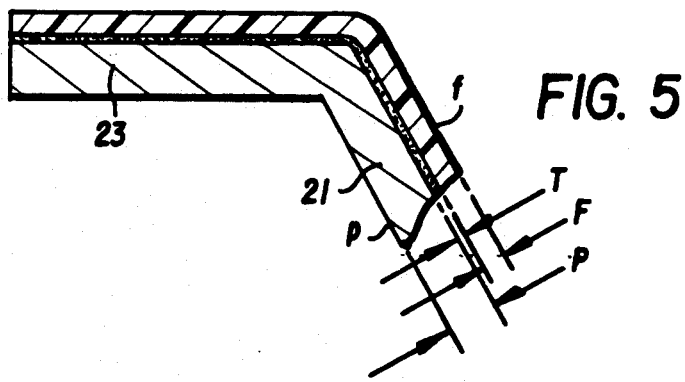
FIG. 5 is an enlarged, partial section detail of the tray structure as viewed along cutting plane V—V of FIG. 1.

A representative article objective of the present invention is illustrated by FIG. 1 and characterized as a flanged tray 10. It will be understood from the following disclosure that numerous vessel shapes such as cubicles, cylinders, cones, truncations and tubs may be fabricated pursuant to the principles herein. These numerous alternative shapes should be obvious to those of ordinary skill in the art and no attempt will be made to individually illustrate such obvious alternatives.

Figure 2:
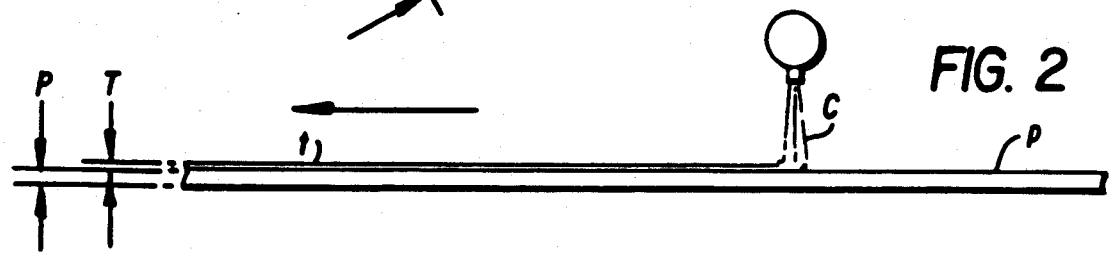
FIG. 2 schematically represents an optional preprocessing step of the invention.

The basic substrate material for tray 10 is paperboard p which may range in thickness, P, from 0.007 to 0.035 inches. Usually, the paperboard stock will be pretreated with an extruded curtain coat t of selected polymer as represented by FIG. 2. This pretreatment polymer is selected on the basis of chemical and adhesive receptivity to a subsequently applied film f to be hereafter described in detail. For example, if the film f is to be a polypropylene, adhesive layer t would appropriately be polypropylene or some other polymer or coating that would readily bond to polypropylene. As a contrasting example, blown films f of high density polyethylene (S.G. 0.94) normally form weak adhesive bonds with paperboard. However, extruded films of low density polyethylene (S.G. 0.923) form good adhesive bonds with both high density polyethylene and paperboard. Consequently, if the final applied film f is to be high density polyethylene, it is necessary to apply an intermediate receptor film t such as low density polyethylene. Usually an adhesive layer thickness T of 0.0005 to 0.0010 inches is sufficient.

It will be understood that the adhesive layer pretreatment of the paperboard substrate, p, may not, in every case, be an essential step depending on the formulation of the finally applied film f. When deemed essential, the adhesive layer t is traditionally applied as a continuously extruded curtain c upon an underrunning paperboard web of indefinite length which is unwound and rewound upon large reels. Alternatively, certain types of adhesive coatings may be applied by a printing press. Printing press applied adhesive coatings may be as thin as 0.001 inch.

If the final tray product is to be decorated with graphics, the wound reels of pretreated paperboard (not illustrated) are processed through a printing press which simultaneously applies positional registration indicia with the graphic decoration.

Figure 3:
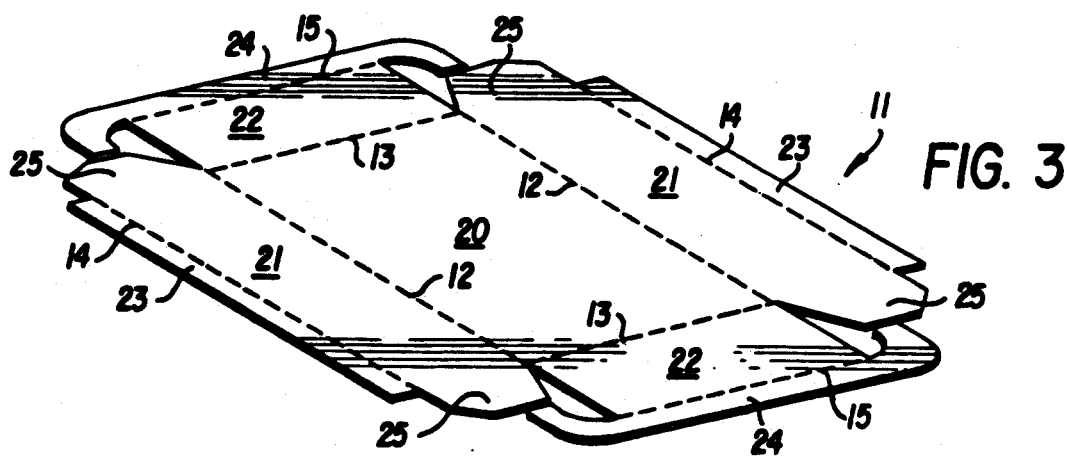
FIG. 3 is a pictorial view of a cut, paperboard tray blank.
Figure 4:
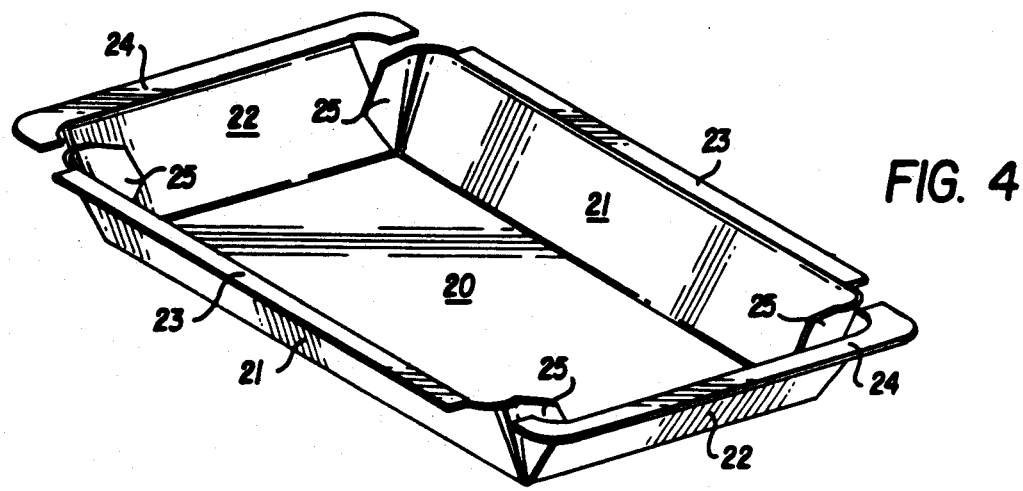
FIG. 4 is a pictorial view of a fold erected paperboard tray blank.

From the graphically decorated and register marked web are cut, by rotary dies for example, the paperboard blanks 11 illustrated by FIG. 3. To the surface of each blank 11 are applied lines of fold weakness i.e. score lines for pre-disposition of a folded configuration. Score lines 12 delineate the tray bottom 20 from the tray sides 21. Score lines 13 delineate the tray bottom 20 from the tray ends 22. In like manner, score lines 14 separate the tray sides 21 from the side flanges 23 and score lines 15 separate the tray ends 22 from the end flanges 24. At each end of the tray side panels 21 is a corner tab 25 which is designed to be wrapped conically around each corner section of the erected tray (FIG. 4) and bonded adhesively or by heat fusion to respective end panels 22.

After cutting and erection, the final film layer f is extrusion blow molded to the interior surfaces of the blank 11 in a manner to be subsequently described. Although the final film f thickness F is, on the average, only about half the paperboard p thickness P, the film f is continuous from the bottom corners to the outer edges of the flanges. Film thickness F may vary considerably respective to specific point locations, however, dependent on the specific tray or vessel shape.

Consistent with state-of-the-art blow molding process, FIGS. 6 through 10 illustrate a symmetrically split mold 30 having mold halves 31 and 32. These mold halves are mechanically linked to reciprocate from an open position represented by FIGS. 6, 7 and 10 to a closed position represented by FIGS. 8 and 9. Characteristic of blow molds, symmetric cavities 33 configured to the external surface dimension and shape of a finished product half section are provided in each mold half. At one end of the mold halves, the product cavities open into a plenum section 34 configured to confine an inflation bulb. Mold half 31 is also provided with a hollow inflation needle 35.

Distinctive of the present invention are vacuum conduits 36 in both halves 31 and 32 with orifices 37 opening into the cavities 33. This vacuum system 36 secures the position of an erected tray blank 11 in each mold cavity prior to film f application; these tray blanks being placed within the respective cavities while the mold unit 30 is open as represented by FIG. 6.

Figures 6, 7:
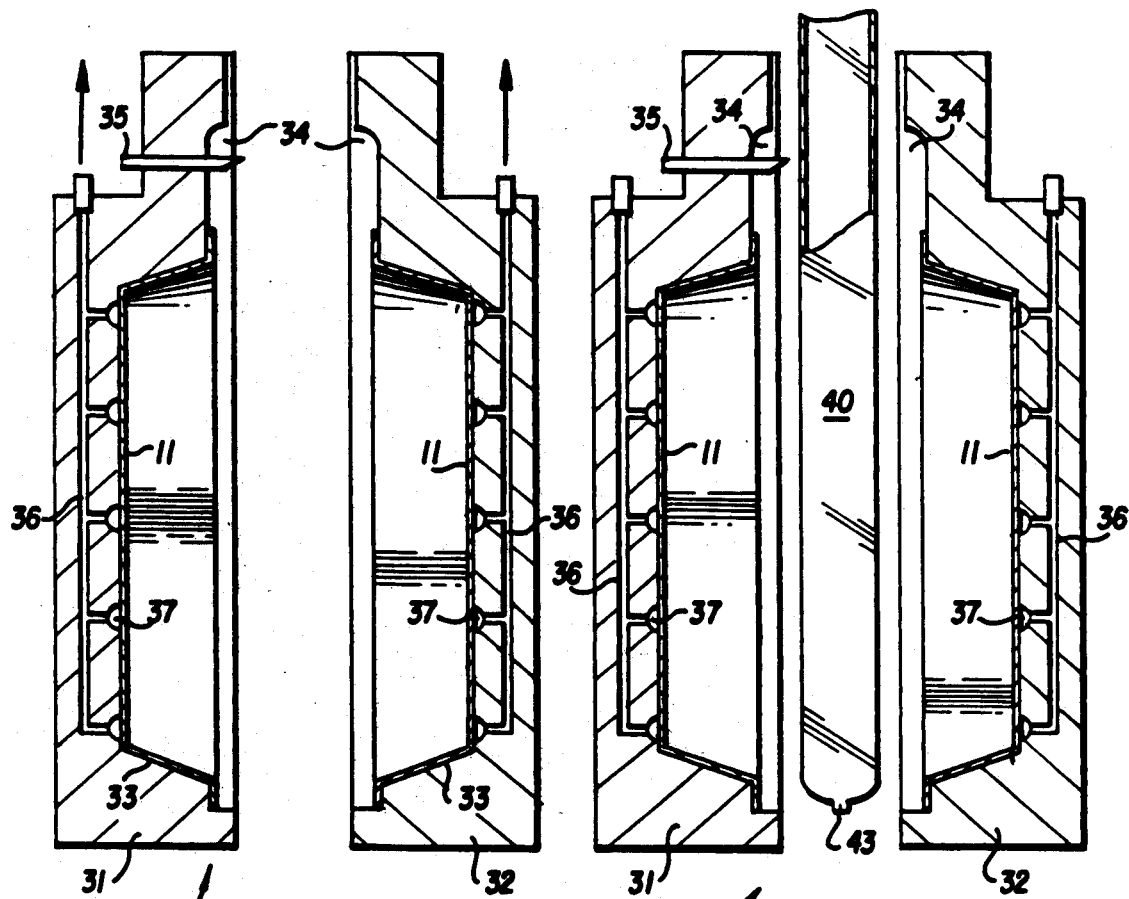
FIG. 6 is an open split blow mold unit corresponding to the present invention.
FIG. 7 is an open, split blow mold unit of the present invention charged with a pair of tray blanks and an extruded parison.

Also while the mold unit is open, a tubular length of film material, known to the art as a parison 40, is extruded between the open mold halves, FIG. 7.

Figure 8:
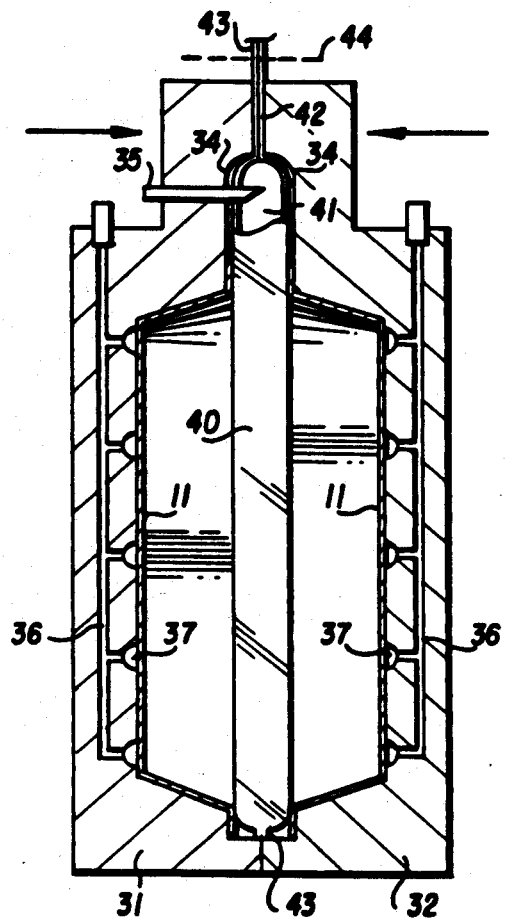
FIG. 8 sectionally illustrates a blow molding unit of the present invention in the closed position prior to parison inflation.

With the tray blanks 11 and parison 40 in place, the mold halves are closed, as represented by FIG. 8, thereby sealing the upper extrusion head (not shown) end of parison 40 along a fused seam 42. The lower or distal end of the parison 40 was sealed along seam 43 by the sam sealing function respective to a previous mold cycle; the two seam areas 42 and 43 being divided by severance along the parison cut line 44 at the conclusion of the prior cycle.

Figure 9:
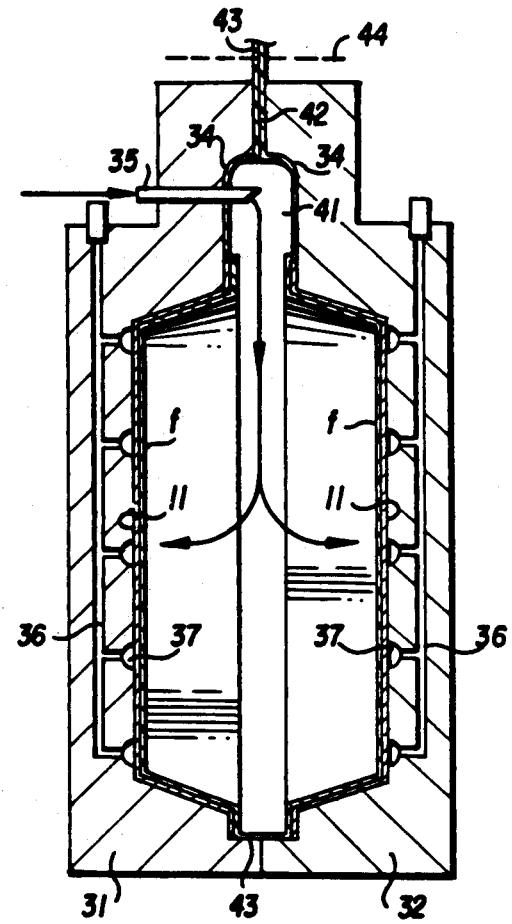
FIG. 9 sectionally illustrates a blow molding unit of the present invention in the closed position after parison inflation.

Closure of the mold halves 31 and 32 also pushes the inflation needle 35 through the parison wall film of inflation bulb 41. In this condition, a charge of compressed air or other gas, in the order of 5 to 90 p.s.i., is released through the inflation needle into the inflation bulb 41 and, consequently, into the closed interior of parison 40. Such pressure within the parison 40 expands the hot, malleable polymer tube tightly against the mold cavity walls and inner surfaces of tray blank 11 as shown by FIG. 9.

Following a brief chilling interval, the two mold halves 31 and 32 are separated as represented by FIG. 10 leaving the two tray blanks 11 securely bonded to the inflated parison 40 as a singular unit 50. This unit 50 is then separated from the extruded parison continuity by a cut 44 between the heat sealed areas 42 and 43.

At this point in the process, unit 50 represents two semifinished trays 10 joined by a continuous, unlaminated band 45 of film f which includes the inflation bulb 41.

Following severance of the parison, the segregated unit 50 is placed upon the anvil element 61 of a cutting die 60. As shown by FIG. 11, striker element 62 engages the underside of the upper tray 10a flange area 23a/24a and presses it against the upper face of the lower tray 10b flange area 23b/24b. Held at this position by die 60, the excess polymer material represented by band 45 may be trimmed by one of several techniques; two of which are represented by FIGS. 12 and 13, respectively. FIG. 12 illustrates a single knife 63 which severs the film band 45 along the edge perimeter of flanges 23a/24a and 23b/24b.

FIG. 13 illustrates a two-knife arrangement whereby an inner knife edge 64 severs a small portion of the flanges 23/24 along with the film band 45. Simultaneously, an outer knife 65 cuts the film band 45 outside of the flange 23/24 edge perimeter.

By either trimming technique, the production objective of cleanly separating the two trays 10a and 10b is served. For economic reasons, it is also desirable to recycle the trimmed polymer of band 45. Paperboard contaminates such recycled polymer. The FIG. 13, two-knife trim technique assures a greater degree of recycle purity notwithstanding greater dimensional variations in the resultant size of flanges 23/24.

Figure 14:
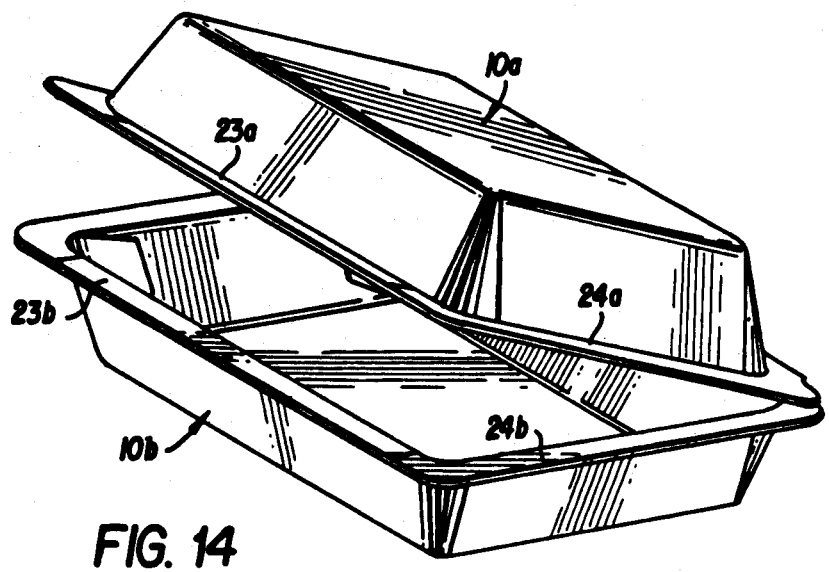
FIG. 14 is a pictorial view of a hinged cover embodiment of the present invention.

FIG. 14 represents a third variation on the band 45 trimming step whereby only three flange areas 23/24 of the unit 50 are trimmed leaving one flange area as a cover 10a hinge. In this state, the trays 10a and 10b remain connected by the original polymer film band to provide a covered, reclosable package suitable for hot food service, for example. Similarly, FIG. 15 illustrates an electric heating element 67 combined with a trim knife 66 for repositioning the location of a lid hinge by simultaneously fusing the film along an area 68 and trimming the excess polymer beyond such fused area.

When the intended use of these trays is for asceptic packaging, the parison may be inflated with a biologically sterile gas and the needle aperature in the inflation bulb 41 sealed upon mold ejection. Such an internally sterile and gas tight unit 50 is shipped and stored in this condition until filling. Trimming, filling and sealing steps are taken in a sterile environment.

Figure 16:
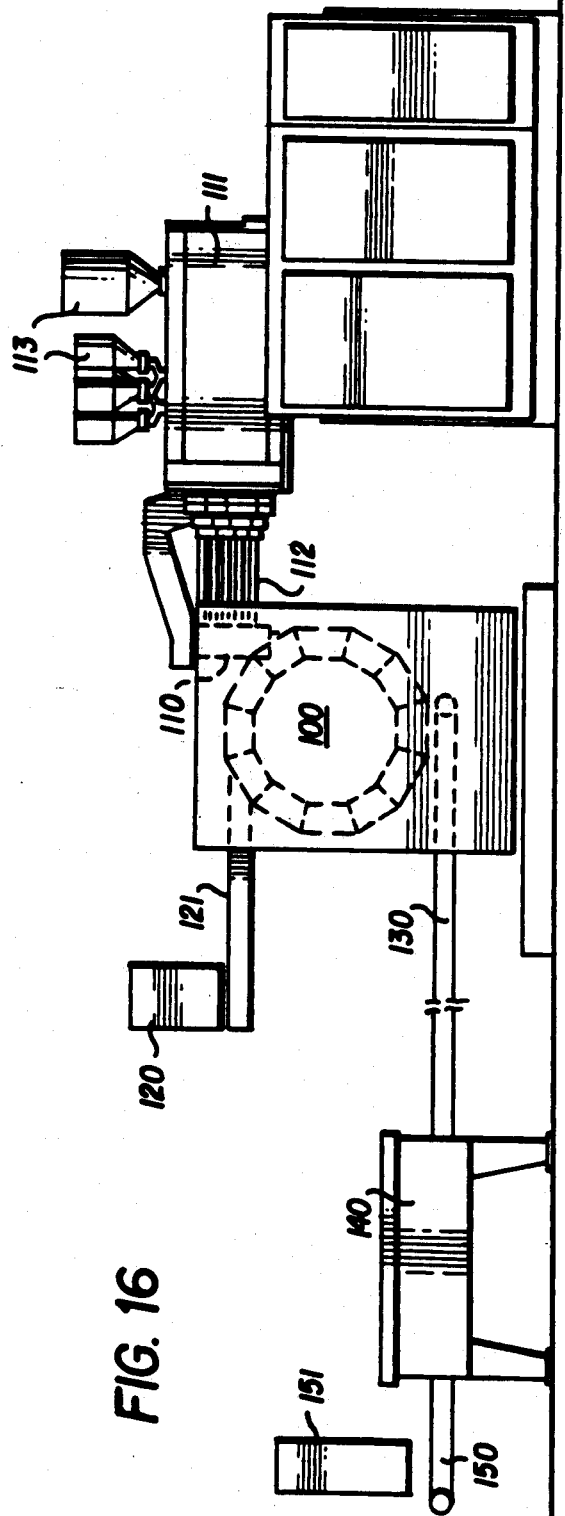
FIG. 16 is an elevation view of an integrated production unit for the present invention.
Figure 17:
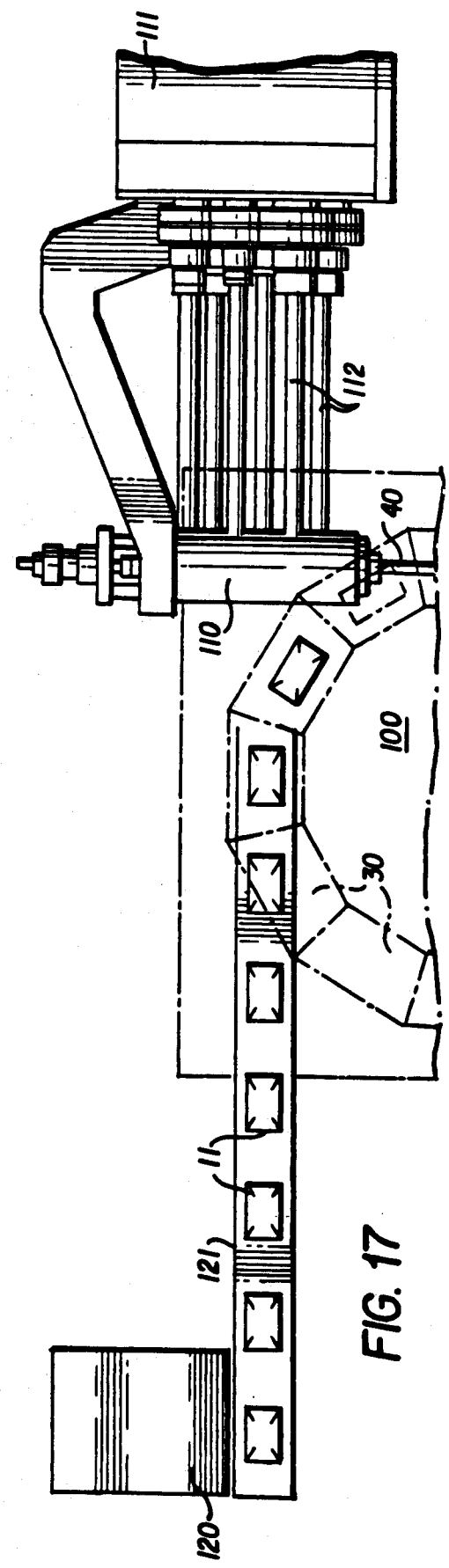
FIG. 17 is an enlarged elevational detail of an integrated production unit for the present invention.
Figure 19:
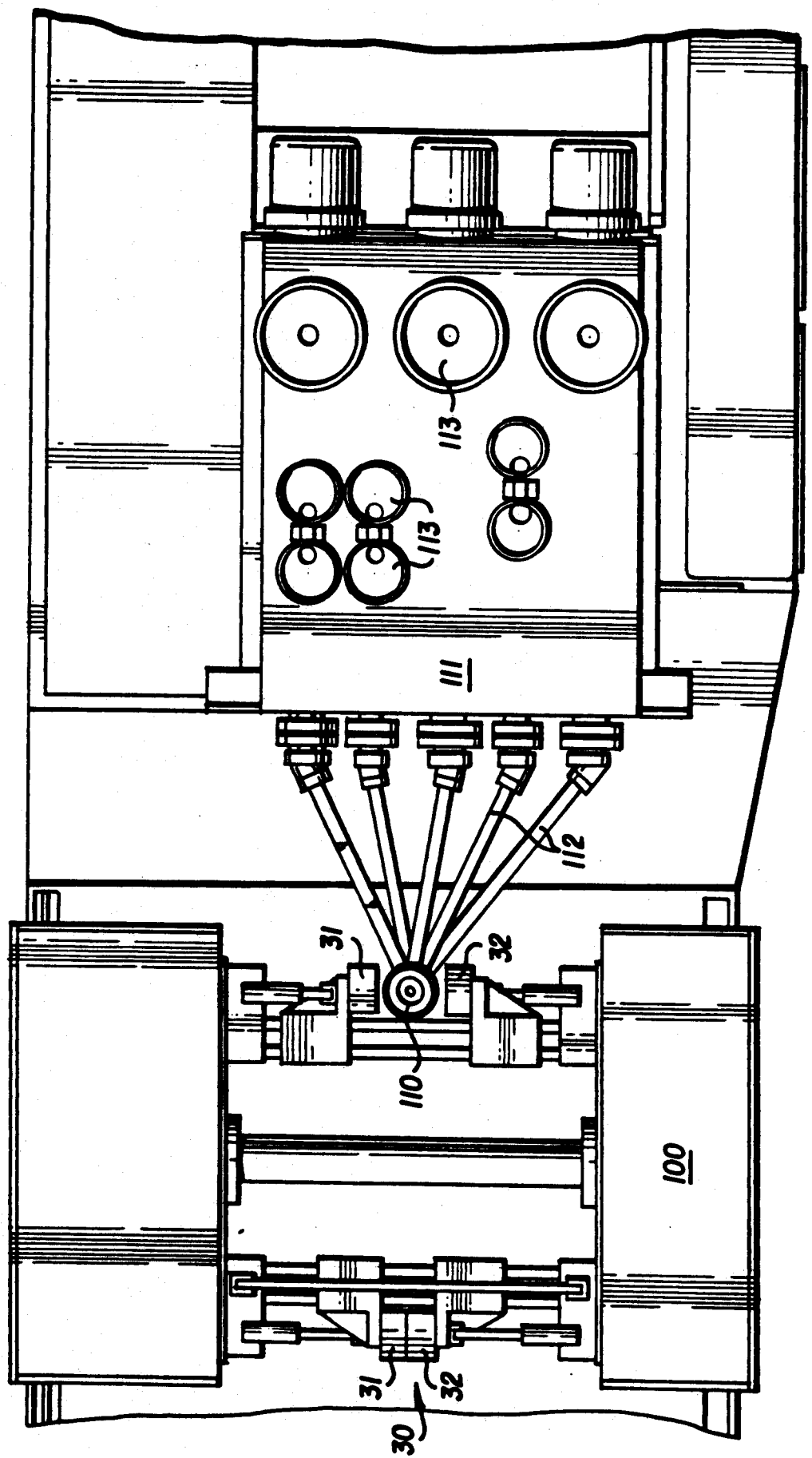
FIG. 19 is an enlarged plan view of the present invention rotary blow molding unit.

Heretofore has been described the basic invention article and process by which it is made. Mass production of the article and process requires the coordinated integration of several machines and art practices, each of which have achieved independent status in the prior art. The elevational layout of FIG. 16 focuses about a rotary blow molding machine 100 served by a coextrusion parison head 110. The coextrusion head 110 is supplied by a plurality of unitized resin extruders 111 connected by individual resin flow tubes 112. Feed hoppers 113 supply solid resin bead to the respective compartments of extruders 111.

Pre-erected tray blanks 11 are loaded into a supply magazine for dispensation to a transfer mechanism 121 which inserts opposing pairs of tray blanks 11 into the open mold halves 31 and 32 of each split mold unit 30. These tray blanks are held in position within the mold cavities by vacuum system 36, described previously, until rotary advancement of the mold wheel achieves alignment with the parison 40 position whereupon the mold halves close and the parison is inflated.

Considering an appropriate chilling interval, the mold units 30 are opened at a rotary release station and the integrated parison and tray blank units 50 are received by a second transfer mechanism 130.

Trim unit 140 at the receiving end of transfer mechanism 130 contains the cutting die unit 60 described with reference to FIGS. 11, 12 and 13. When the product objective is singular tray units 10, trim unit 40 may also include an inverting mechanism, not shown, to align the two separate trays respective to an opposed, integrated unit 50. So aligned, the finished trays 10 are delivered to a third transfer mechanism 150 for receipt by a nesting load hopper 151.

Although the extruded film f has been generally described as an homogenous polymer material, which it may be, it should be understood that the invention is not so limited. The melted polymer extrusion art is capable of extruding multiple layers of diverse polymers in a single parison flow stream. Consequently film f composites may be designed to include several different compound layers, each selected on the basis of maximum barrier properties for a specific gas or combination of gases.

Having fully described my invention, I claim:

1. A blow molded composite material fluid container comprising a paperboard exterior substrate having a thickness of 0.007 to 0.035 inches formed to a fluid containment configuration having an interior vessel surface area, said formed paperboard substrate having a seamless, creaseless and unlapped fluid barrier coating of blow molded polymer integrally bonded to substantially the entire vessel surface area thereof, said barrier coating having an average thickness about half of said paperboard thickness.

2. A fluid container as described by claim 1 wherein said substrate includes a 0.0001 to 0.001 thick lamination of adhesive coating integrally bonded thereto prior to said forming, said fluid barrier coating of blow molded polymer being integrally bonded to said adhesive coating in said interior vessel surface area.

3. A fluid container as described by claim 1 wherein at least two such substrates are bonded to the same fluid barrier coating of blow molded polymer with a hinge segment of said coating therebetween.

4. A fluid container as described by claim 1 wherein said paperboard exterior substrate includes a flange element projecting outwardly from said vessel surface area and said blow molded polymer barrier coating is bonded integrally and continuously from said interior vessel surface area onto said flange element.

5. A fluid container as described by claim 4 wherein the surface of said paperboard substrate flange element having said barrier coating bonded thereto is uninterrupted by pleats or laps.

6. A blow molded composite material fluid container produced by the process of:
   forming a container blank of 0.007 to 0.035 inch thick paperboard;
   shaping said container blank to a fluid containment configuration having an interior vessel surface area;
   inserting said shaped container blank against a blow mold cavity wall whereby said vessel surface area faces a cavity volume within said wall;
   extruding a blow mold parison of polymer film into said mold cavity volume; and,
   blowing said blow mold polymer film against said vessel surface area whereby substantially the entire vessel surface area is coated with a seamless, creaseless, unlapped and integrally bonded fluid barrier of polymer film having an average thickness about half of said paperboard thickness.

7. A blow molded fluid container produced by the process described by claim 6 wherein respective constituents of an opposing pair of shaped container blanks are inserted in respective cavities of a divided blow mold.

8. A blow molded fluid container produced by the process described by claim 7 wherein said container blanks are held by vacuum against said respective cavity walls.

9. A blow molded fluid container produced by the process described by claim 7 wherein said container blanks are separated within said mold cavity to provide a continuous band of parison film formed against said cavity walls between film coated container blanks.

10. A blow molded container produced by the process described by claim 9 wherein independent film coated containers are obtained by trimming said continuous band.

11. A blow molded container produced by the process described by claim 9 whereby said continuous band between film coated container blanks is partially trimmed to leave a hinge portion of film between said coated container blanks.

12. A blow molded container produced by the process described by claim 9 whereby said continuous band between film coated container blanks is trimmed and fused along a perimeter increment to provide a hinge portion of film between said coated container blanks.

* * * * *